United States Patent [19]

Yoshida

[11] Patent Number: 5,428,812

[45] Date of Patent: Jun. 27, 1995

[54] DATA DRIVEN PROCESSORS SYSTEM FOR ADAPTIVELY CONFIGURING WIDTH OF THE DESTINATION FIELD BASED ON THE NUMBER OF DETECTED INFORMATION PROCESSORS

[75] Inventor: Shinichi Yoshida, Kashihara, Japan

[73] Assignee: Sharp Kabushiki Kaisha, Osaka, Japan

[21] Appl. No.: 265,621

[22] Filed: Jun. 24, 1994

Related U.S. Application Data

[63] Continuation of Ser. No. 978,422, Nov. 18, 1992, abandoned.

[30] Foreign Application Priority Data

Nov. 18, 1991 [JP] Japan ..................... 3-301768

[51] Int. Cl.$^6$ ................. G06F 15/76; G06F 15/82
[52] U.S. Cl. ..................... 395/800; 395/400; 364/DIG. 1; 364/961.1; 364/232.22; 364/261.2
[58] Field of Search ............... 395/200, 250, 800, 400

[56] References Cited

U.S. PATENT DOCUMENTS

| | | | |
|---|---|---|---|
| 4,156,910 | 5/1979 | Barton et al. | 364/200 |
| 4,953,083 | 8/1990 | Takata et al. | 364/200 |
| 4,965,715 | 10/1990 | Yoshida | 364/200 |
| 4,985,895 | 1/1991 | Pelkey | 371/37.7 |
| 5,093,919 | 3/1992 | Yoshida et al. | 395/800 |
| 5,125,097 | 6/1992 | Okamoto et al. | 395/800 |
| 5,297,144 | 3/1994 | Gilbert et al. | 370/95.2 |

*Primary Examiner*—Thomas C. Lee
*Assistant Examiner*—Rehana P. Krick

[57] ABSTRACT

A destination field of a data packet to be processed by a data driven type processor includes a field for storing a processor number for specifying a processor by which the data packet is to be processed and a field for storing a node number for addressing a memory space wherein a data flow program to be executed us stored. In a case of structuring one system by coupling a plurality of such data driven type processors, a minimum bit width of the above-described processor number field is determined according to the number of data driven type processors and all fields but the processor number field of the destination field are allotted to the above-described node number field. As a result, the node number field is always allotted a maximum bit width according to the number of data driven type processors constituting the system, so that a memory space allowing the above-described addressing is constantly made largest, in other words, an executable program capacity in each data driven type processor and the system is always maintained at a maximum.

24 Claims, 7 Drawing Sheets

DATA DRIVEN PROCESSORS SYSTEM FOR ADAPTIVELY CONFIGURING WIDTH OF THE DESTINATION FIELD BASED ON THE NUMBER OF DETECTED INFORMATION PROCESSORS

This application is a continuation of application Ser. No. 07/978,422 filed on Nov. 18, 1992, now abandoned.

BACKGROUND OF THE INVENTION

1. Field of the Invention

The present invention relates generally to data driven type information processors, and more particularly, a plurality of data driven type information processors connected to each other to form a system so as to allow field constitution of data packets to be processed by each data driven type information processor to be varied.

2. Description of the Background Art

FIGS. 4A and 4B are diagrams showing an arrangement of a system structured by connecting a plurality of data driven type information processors to be applied in a prior art system and a system for one embodiment of the present invention.

FIGS. 4A and 4B show systems structured by connecting, for example, four data driven type information processors. In a connection example 1 of FIG. 4A, data driven type information processors (hereinafter referred to as a data driven type processor) 100, 101, 102 and 103 are connected in parallel. The system of FIG. 4B is structured by connecting the data driven type processors 100 to 103 in series.

Each of the data driven type processors shown in FIGS. 4A and 4B has two transmission paths connected for input/output. Processor numbers #0 to #3 are respectively allotted to the data driven type processors 100 to 103 in advance. In FIG. 4A, an output end of the data driven type processor 100 with the number #0 is connected to an input end of the data driven type processor 103 with the number #3 through a transmission path 20 and is also connected to an input end of the data driven type processor 102 with the number #2 through a transmission path 21. An output end of the data driven type processor 102 with the number #2 is connected to an input end of the data driven type processor 100 with the number #0 through the transmission path 20 and is also connected to an input end of a data driven type processor (not shown) with the number #4 through the transmission path 21. An output end of the data driven type processor 103 with the number #3 is connected to an input end of the data driven type processor 101 with the number #1 through the transmission path 20 and is also connected to an input end of a data driven type processor (not shown) with the number #5 through the transmission path 21.

In the system of FIG. 4B, the data driven type processors 100 to 103 each have an output end connected to an input end of a data driven type processor in a succeeding stage through the transmission paths 20 and 21.

FIG. 5 is a block diagram showing a data driven type processor to be applied to the prior art system.

FIG. 6 is a diagram showing an example of a field constitution of data packets in a data driven type processor to be applied to the prior art system and a system for one embodiment of the present invention.

A data packet PA of FIG. 6 is constituted by a destination field $F_1$, an instruction field $F_2$, a data 1 field $F_3$ and a data 2 field $F_4$. The destination field $F_1$ stores destination information D, the instruction field $F_2$ stores instruction information C and the data 1 field or the data 2 field stores operand data OP. FIG. 7 shows an example of a conventional constitution of the destination field $F_1$ of the data packet PA shown in FIG. 6. In FIG. 7, the destination field $F_1$ further includes a processor number field $F_{13}$ and a node number field $F_{14}$, the processor number field $F_{13}$ storing processor number data $PE_1$ and the node number field $F_{14}$ storing node number data ND. The destination field $F_1$ has a fixed bit width d, the processor number field $F_{13}$ has a bit width p and the node number field $F_{14}$ has a bit width n, with $d = p + n$ established (p and n are fixed values).

A data driven type processor 100i (i=1, 2, 3, ..., n) of FIG. 5 includes junction portions 0, 3 and 4, branching portions 1, 600 and 800, a program storing portion 500, a data pair generating portion 6 and an operation processing portion 7. The junction portion 0 has an input terminal connected to two transmission paths and is connected to the branching portion 600 through a transmission path 9. The branching portion 600 has a storage region 601 for storing processor number data PE for uniquely designating the data driven type processor 100i and is connected to the junction portion 4 through a transmission path 10 and to the junction portion 3 through a transmission path 17. The junction portion 4 has an input end connected to the branching portion 600 through the transmission path 10 and to the branching portion 800 through a transmission path 15, and an output end connected to the program storing portion 500 through a transmission path 11. The program storing portion 500 has an input end connected to the transmission path 11 and an output end connected to the data pair generating portion 6 through a transmission path 12. The data pair generating portion 6 has an input end connected to the transmission path 12 and an output end connected to the operation processing portion 7 through a transmission path 13. The operation processing portion 7 has an input end connected to the transmission path 13 and an output end connected to the branching portion 800 through a transmission path 14. The branching portion 800 has an input end connected to the transmission path 14, a storage region 801 for storing the processor number data PE, and an output end connected to the junction portion 4 through the transmission path 15 and to the junction portion 3 through a transmission path 16. The junction portion 3 has an input end connected to the transmission paths 16 and 17 and an output end connected to the branching portion 1 through a transmission path 18. The branching portion 1 has an input end connected to the transmission path 18 and an output end connected to transmission paths 20 and 21. The transmission paths connected to the input end of the junction portion 0 and the output end of the branching portion 1 serve to establish communication and connection between the data driven type processor 100i and other processors.

FIG. 8 is a diagram showing a part of a field constitution of storage contents of the program storing portion 5 to be applied to the prior art system and a system for one embodiment of the present invention.

The data driven type processor 100i of FIG. 5 stores processor number data PE in advance at the time of power application or the like. The processor number data PE is stored in the respective storage regions of the branching portions 600 and 800 upon operation of an external switch (not shown) to apply a signal. Thus, a series of processings is initiated by setting, in the data driven type processor 100$i$, the processor number data PE for uniquely designating the data driven type processor 100$i$.

The data driven type processor 100$i$ externally receives a data packet PA having the field constitution shown in FIG. 6 through a transmission path. The received data packet PA is first applied to the junction portion 0.

The junction portion 0 applies the data packet PA to the branching portion 600 through the transmission path 9.

The branching portion 600 with processor number data PE stored in advance, compares processor number data $PE_1$ in the destination field $F_1$ shown in FIG. 7 in the input data packet PA and the previously stored processor number data PE, and outputs the applied data packet PA to the transmission path 10 when the data match with each other. If they mismatch with each other, the branching portion outputs the data packet PA to the transmission path 17.

The data packet PA applied to the transmission path 17 is provided to the transmission path 18 through the junction portion 3 and is further provided to the branching portion 1.

The branching portion 1 switches a transmission path for output according to the processor number data $PE_1$ of the applied data packet PA. For example, if the processor number data $PE_1$ is of an odd-number, the data packet PA is sent to the transmission path 20 and if the data packet PA is of an even-number, the data packet PA is sent to the transmission path 21.

The data packet PA provided onto the transmission path 10 is applied to the transmission path 11 through the junction portion 4 and is applied to the program storing portion 500.

The program storing portion 500 with the data flow program stored in advance, a part of which program is shown in FIG. 8, reads destination information $D_1$ and instruction information $C_1$ in the subsequent order as shown in FIG. 8, by addressing based on node number data ND of the input data packet PA of FIG. 7, and the program storing portion stores the read destination information $D_1$ and the read instruction information $C_1$ respectively in the destination field $F_1$ and the instruction field F2 of the input data packet PA and outputs the packet. The output data packet PA is applied to the data pair generating portion 6 through the transmission path 12.

The data pair generating portion 6 queues data packets PA applied from the program storing portion 500, that is, the data pair generating portion 6 detects two different data packets PA whose destination information D match with each other, stores operand data OP of one of the two data packets PA having the same destination information D, for example, the contents of the data 1 field $F_3$ of one data packet as shown in FIG. 6, in the data 2 field $F_4$ of the other data packet as shown in FIG. 6, and outputs the other data packet. The output other data packet PA is applied to the operation processing portion 7 through the transmission path 13. At this time, the remaining data packet PA disappears.

The operation processing portion 7 conducts a predetermined operation processing for the data packet PA applied from the data pair generating portion 6, stores the result in the data 1 field $F_3$ of the input data packet PA and applies the data packet to the branching portion 800 through the transmission path 14.

Similarly to the branching portion 600, the branching portion 800 stores the processor number data PE in advance. The branching portion 800 compares the processor number data $PE_1$ in the destination field $F_1$ shown in FIG. 7 in the applied data packet PA with the stored processor number data PE. If the data match with each other, the data packet PA is provided to the transmission path 15. If they mismatch with each other, the input data packet PA is provided to the transmission path 16.

The data packet PA circulates through the program storing portion 500→the data pair generating portion 6→the operation processing portion 7→the program storing 500→ . . . by following the foregoing processing procedure to execute operation processings based on the data flow program stored in the program storing portion 500.

Also in the systems including a plurality of processors 100$i$ as shown in FIGS. 4A and 4B, data packets PA are allotted to the respective processors constituting the system according to the processor number data $PE_1$.

Also in a system including a plurality of the above-described conventional data driven type processors connected to each other, a field constitution of the destination field $F_1$ in the data packet PA is fixed as shown in FIG. 7. More specifically, with a bit width of the destination field $F_1$ being d bits, a bit width p of the processor number field $F_{13}$ and a bit width n of the node number field $F_{14}$ are both fixed values, wherein $d=p+n$ is established.

When the field $F_{13}$ has a bit width of p, the maximum of $2^p$ data driven type processors can be identified. Therefore, one system can be structured by up to $2^p$ data driven type processors. However, with data driven type processors of not more than $2^{(p-1)}$ used, the field $F_{13}$ of the destination field $F_1$ has some bit left unused. Since the field constitution is fixed, the unused bits cannot be used for the node number data ND to be stored in the same destination field, and the node number data ND is fixed to data of n bits even the processor number field $F_1$ has unused bits. Therefore, a capacity of an executable data flow program is limited. This also limits an executable program capacity of the system, thereby lowering an operation efficiency.

SUMMARY OF THE INVENTION

An object of the present invention is to provide data drive type information processors to be coupled to form a system so as to allow an executable program capacity to be maximized at any time by making good use of a field constitution of data packets.

In order to achieve the object, the data driven type information processor according to an embodiment of the present invention, when a plurality of the processors are coupled to each other to constitute a system, is structured such that destination information of a data packet to be processed in the system includes at least a destination processor number for uniquely designating an information processor which is to process the packet and a destination node number for designating an address for addressing data flow programs stored in the respective processors in advance, and a field constitution of a destination field of the data packet for storing the destination information is varied to allow the constitution of the destination field to be changed according to the number of information processors constituting the system. This enables a bit width of a field for storing a destination processor number in a destination field to be minimized and a bit width of a field for storing a destination node number to be maximized at any time according to the number of information processors constituting the system. Since a bit width of a field for storing a destination node number can be maximized at any time according to the number of the information processors constituting the system, a program memory space allowed for addressing based on the destination node number can be maximized at any time, that is, a program capacity executable in each information processor and the system is constantly maximized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be described in detail with reference to the drawings.

Figure 1:
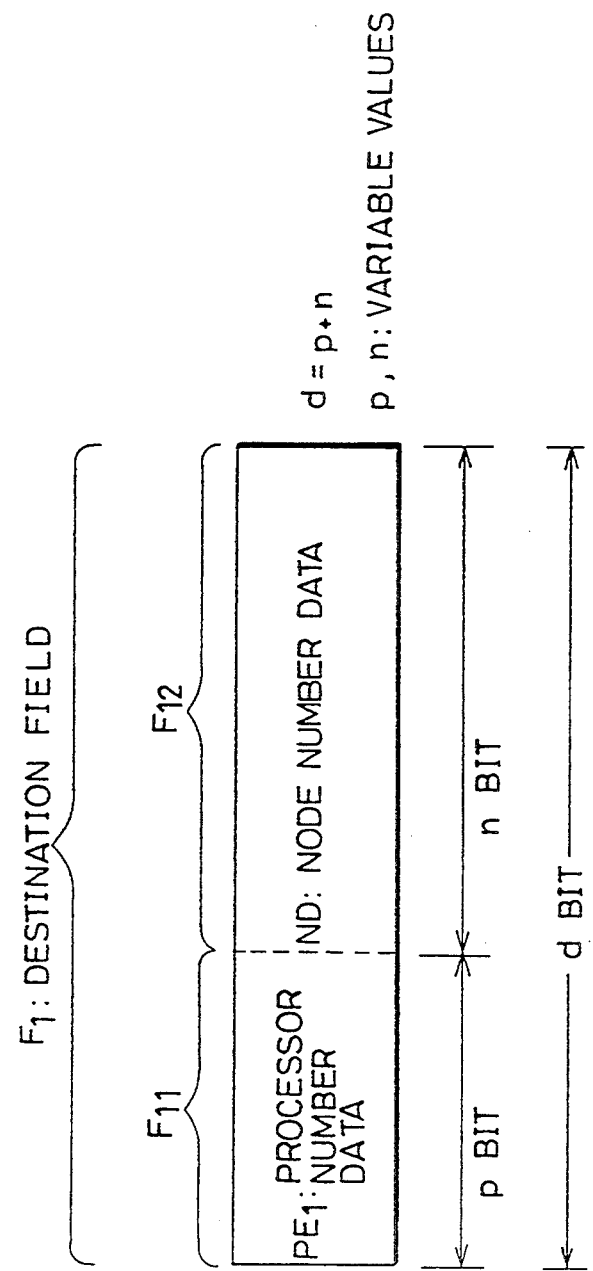
FIG. 1 is a diagram showing a detailed constitution of a destination field in a data packet according to one embodiment of the present invention.
Figure 2:
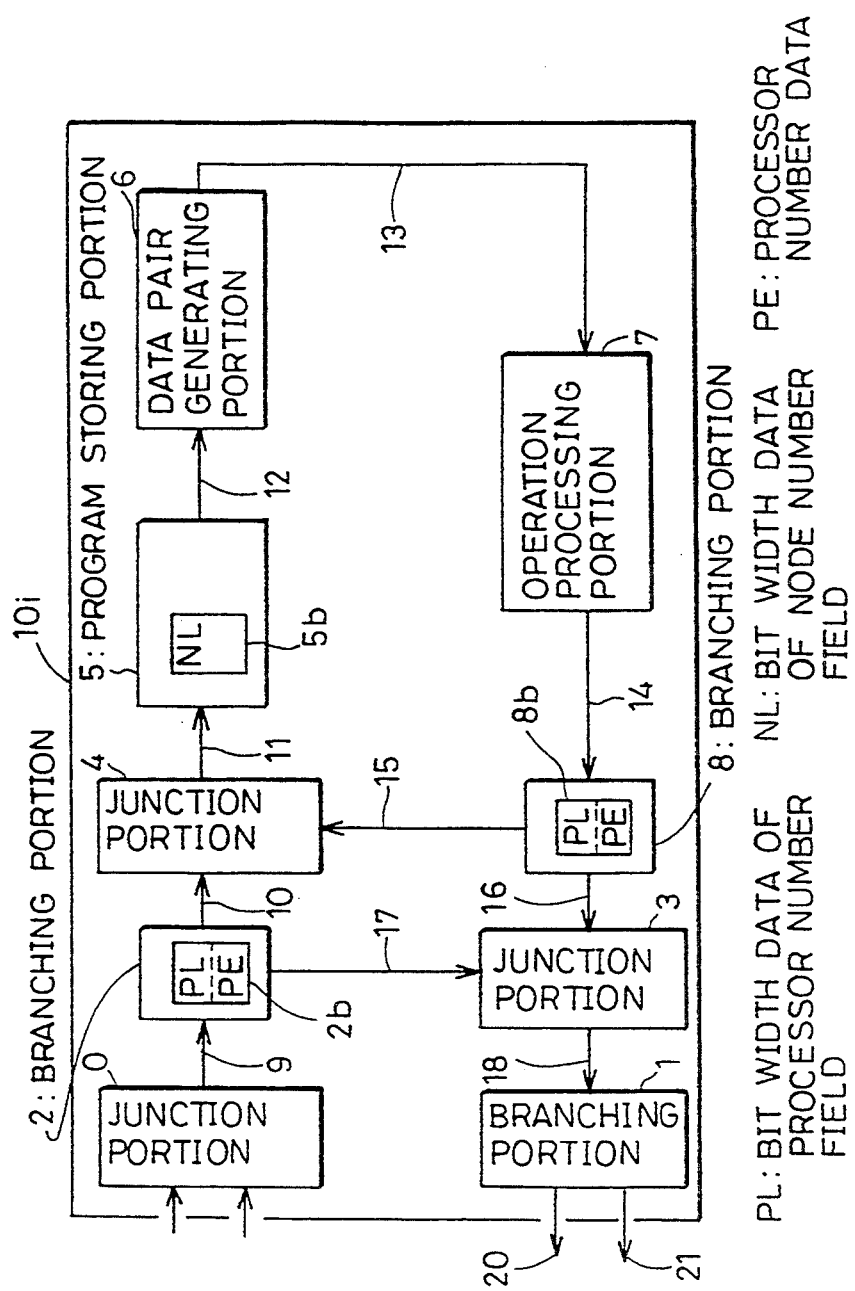
FIG. 2 is a block diagram of a data driven type processor according to one embodiment of the present invention.

FIG. 1 is a diagram showing a detailed constitution of a destination field, out of field constitutions, of a data packet PA according to one embodiment of the present invention, and FIG. 2 is a block diagram showing a structure of a data driven type processor for processing the data packet PA.

Figure 4:
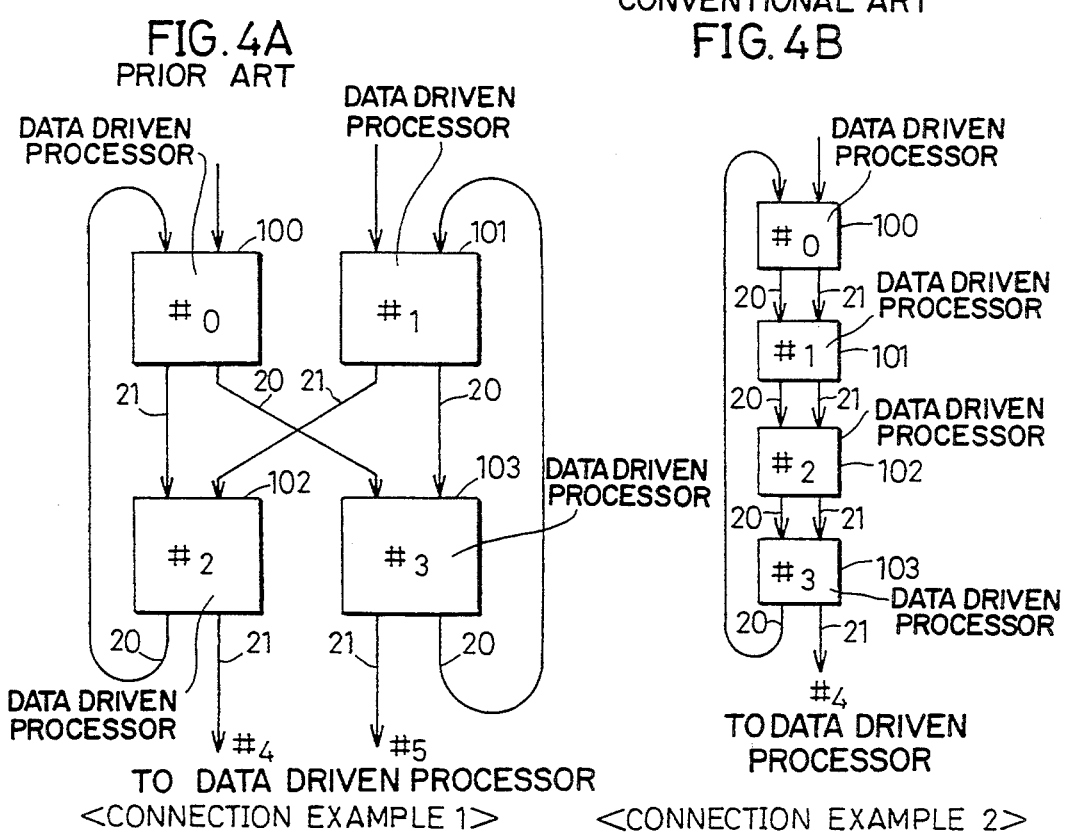
FIGS. 4A and 4B are diagrams showing a structure of a system including a plurality of coupled data driven type information processors to be applied to the prior art system and a system for one embodiment of the present invention.
Figure 6:
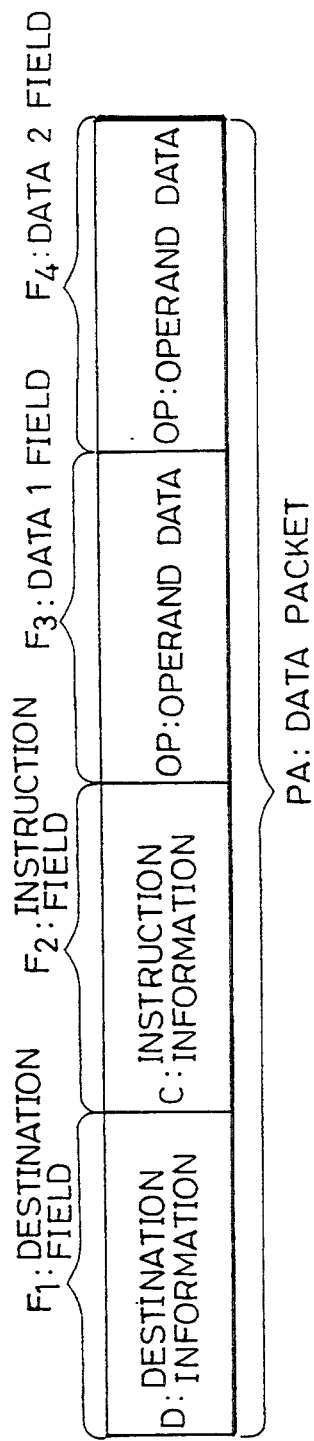
FIG. 6 is a diagram showing an example of a field constitution of a data packet for use in a data driven type processor to be applied to the prior art system and a system for embodiment of the present invention.
Figure 7:
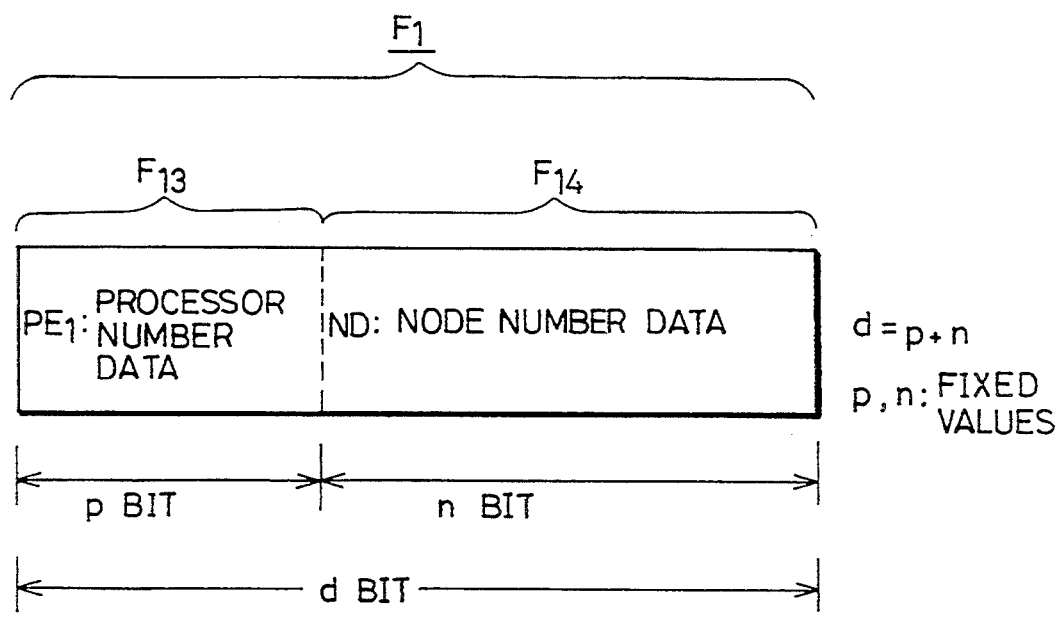
FIG. 7 is a diagram showing an example of a conventional constitution of a destination field of a data packet shown in FIG. 6.
Figure 8:
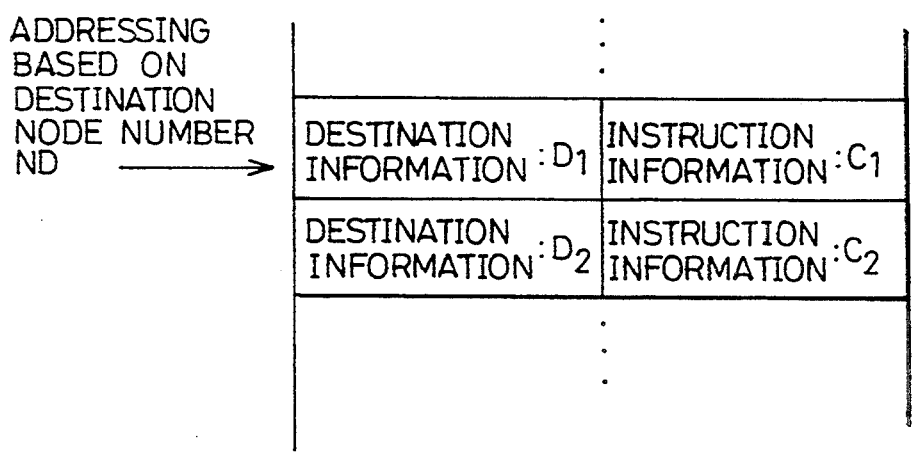
FIG. 8 is a diagram showing part of a field constitution of storage contents of a program storing portion to be applied to the prior art system and a system for one embodiment of the present invention.

A structure of a system including a plurality of data driven type processors $10i$ coupled according to one embodiment of the present invention is the same as those shown in FIGS. 4A and 4B, and a field constitution of a data packet PA and a field constitution of storage contents of a program storing portion 5 according to the present embodiment are respectively the same as conventional constitutions shown in FIGS. 6 and 8 and therefore no detailed description of which is made.

FIG. 1 shows a detailed constitution of a destination field $F_1$, out of field constitutions of a data packet according to the present embodiment. The present embodiment has a field constitution of the destination field $F_1$ in a data packet arbitrarily variable as shown in FIG. 1. More specifically, with a bit width of the destination field $F_1$ having a predetermined fixed value of d bit, a bit width p of a processor number field $F_{11}$ and a bit width n of a node number field $F_{12}$ are set to be variable, wherein $d=p+n$ is established.

Figure 5:
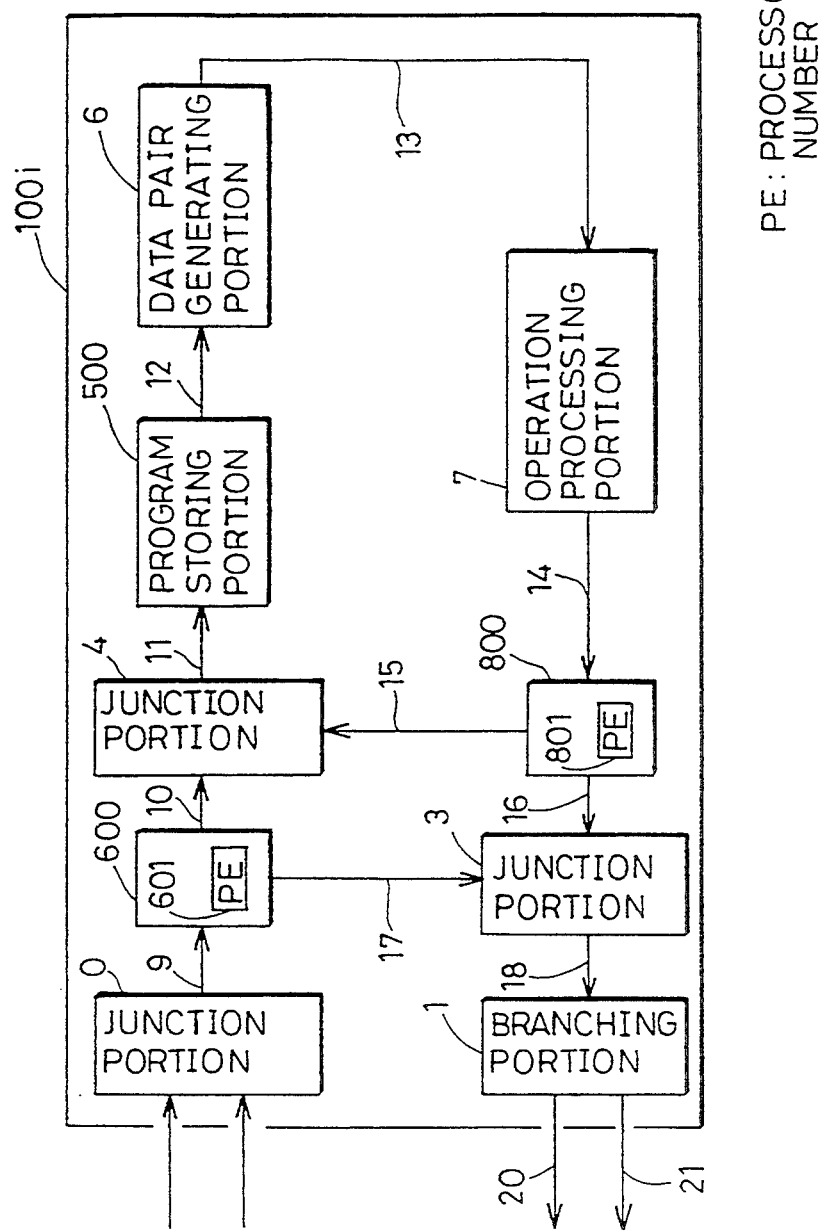
FIG. 5 is a block diagram of a conventional data driven type processor.

FIG. 2 is a block diagram showing a structure of a data driven type processor $10i$ for processing a data packet PA according to the present embodiment. There is no difference in structure between the data driven type processor $10i$ according to the present embodiment shown in FIG. 2 and the conventional data driven type processor $100i$ shown in FIG. 5 and described above. The difference is in data to be stored in the program storing portion 5, and branching portions 2 and 8 of the data driven type processor $10i$. That is, the data driven type processor $10i$ according to the present embodiment stores bit width data PL of a processor number field and bit width data NL of a node number field in addition to processor number data PE. A variable bit width p of the processor number field $F_{11}$ shown in FIG. 1 is stored in storage regions $2b$ and $8b$ of the branching portions 2 and 8 as bit width data PL. The bit width n of the node number field $F_{12}$ of FIG. 1 is stored in a storage region $5b$ of the program storing portion 5 as bit width data NL of the node number field. These bit width data PL and NL are set in each storage region by, for example, an externally operated switch input, at the time of setting of processor number data PE. After the data setting, each data driven type processor and the system are rendered operative.

Figure 3:
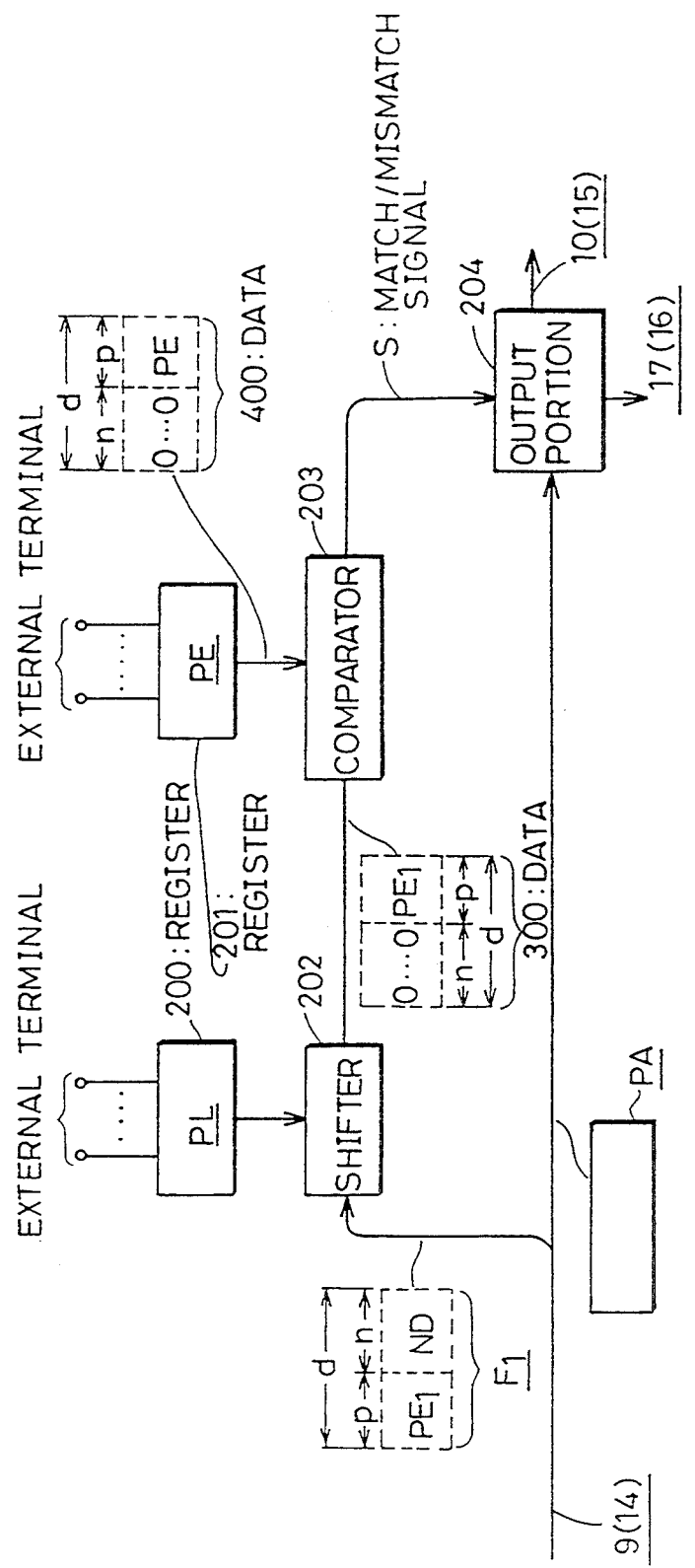
FIG. 3 is a block diagram of a branching portion shown in FIG. 2.

A block diagram of the above-described branching portions 2 and 8 is shown in FIG. 3. The branching portion 2 and the branching portion 8 have the same structure in block and operation. Therefore, the following description with reference to FIG. 3 is commonly applicable to the branching portions 2 and 8.

With reference to FIG. 3, a branching portion 2 (8) includes a register 200 for storing bit width data PL of a processor number field, a register 201 for storing processor number data PE, a shifter 202, a comparator 203 and an output portion 204. The registers 200 and 201 are equivalent to a storage region $2b$ ($8b$) and both of the registers are connected to externally operable terminals (equivalent to external switches), operation of which terminals results in storing data PL and PE. The shifter 202 accepts applied data, shifts the data rightward by the amount of bits calculated by using data PL stored in the register 200 and outputs the shifted data. The comparator 203 accepts applied data, compares the accepted data with data PE stored in the register 201 and outputs a result as a match/mismatch signal S. The output portion 204 accepts an applied data packet PA and transmits the packet PA to either a transmission path 10 (15) or a transmission path 17 (16) in response to the signal S output from the comparator 203.

In operation, when a data packet PA is applied to the branching portion 2 (8) through a transmission path 9 (14), the data packet PA is provided to the output portion 204, while data of a data field $F_1$ of the packet is applied to the shifter 202. On accepting the data of the data field $F_1$, the shifter 202 shifts the accepted data by the amount of $(d-p)=n$ bit rightward by using data PL stored in the register 200 and outputs the shifted data to the comparator 203. As a result, the comparator 203 receives data 300 of a d bit width including processor number data $PE_1$ shifted rightward and having "0" set at higher-order n bits. On accepting the data 300, the comparator 203 compares data PE stored in the register 201 with the applied data 300. At this time, data 400 of a d bit width including data PE shifted rightward is being stored in the register 201, the comparator 203 compares the data 400 with the data 300. A comparison result is applied to the output portion 204 as a match-/mismatch signal S. The output portion 204 transmits the input packet PA to the transmission path 10 (15) if they match with each other, and to the transmission path 17 (16) if they mismatch with each other in response to the signal S.

The above-described shift processing by the shifter whose shift amount is variable in the branching portion 2 (8) is also executed by the program storing portion 5. When the program storing portion 5 receives a data packet PA, the portion shifts data in the destination field $F_1$ of the data packet leftward by the amount of bit width data NL stored previously in a storage region $5b$, reads node number data ND from the destination field $F_1$ and designates an address by using the node number data ND in a manner as shown in FIG. 8.

In operation of the data driven type processor shown in FIG. 2, when a data packet PA is applied to the branching portion 2 through the junction portion 0, the branching portion 2 compares processor number data PE stored in the storage region $2b$ with processor number data $PE_1$ in the processor number field $F_{11}$ in the applied data packet PA read according to bit width data PL, thereby determining an output destination of the applied data packet. If the processor number data are found to match with each other by the comparison, the applied data packet PA is provided to the program storing portion 5 through the junction portion 4. If the processor number data are found to mismatch by the comparison, the applied data packet is provided to the branching portion 1 through the junction portion 3 and output outside the data driven type processor $10i$.

The program storing portion 5 accepts the data packet PA applied from the junction portion 4. Since the storing portion 5 stores a bit width n of the node number field $F_{12}$ in the destination field $F_1$ of the applied data packet PA as bit width data NL in advance, the storage portion 5 reads node number data ND of the applied data packet PA based on a bit width data NL to read destination information $D_1$ and instruction information $C_1$ in the subsequent order of the data flow program shown in FIG. 8 by addressing based on the read node number data ND. The read destination information $D_1$ and instruction information $C_1$ are respectively stored in the destination field $F_1$ and the instruction field $F_2$ of the applied data packet PA and output.

The data packet PA output from the program storing portion 5 queues for a data packet having the same destination information in the subsequent data pair generating portion 6. A new data packet PA is generated from two different data packets having the same destination information and applied to the operation processing portion 7 in a conventional manner.

The operation processing portion 7 performs the predetermined operation processing for the applied data packet PA, stores a result of the operation in the data 1 field $F_3$ of the applied data packet PA, which packet is applied to the branching portion 8.

Similar to the above-described branching portion 2, the branching portion 8 stores processor number data PE and bit width data PL. The branching portion 8 reads processor number data $PE_1$ in the destination field $F_1$ of the applied data packet PA according to the bit width data PL and compares the read processor number data $PE_1$ with the previously stored processor number data PE. If the processor number data are found to match with each other by the comparison, the input data packet PA is output to the transmission path 15. If they are found to mismatch with each other, the input data packet PA is output to the transmission path 16.

An operation processing is carried out based on the data flow program stored in the program storing portion 5 following the foregoing processing procedure.

In a case of structuring a system by connecting, in a manner as shown in FIG. 4A or FIG. 4B, a plurality of the above-described processors, one of which is shown in FIG. 2, a width of a p bit of the processor number field $F_{11}$ is determined to be minimum with the least loss in order to uniquely specify each data driven type processor included in the system. In a case of a system including eight processors, for example, a bit width of the processor number field $F_{11}$ is determined to be 3 bits and all bits but the three bits of the destination field $F_1$ are allotted to n bits of the node number field $F_{12}$. As a result, the node number field $F_{12}$ is constantly allotted the maximum bit width according to the number of processors constituting the system, so that it is possible to constantly maximize a program memory space allowed for addressing based on the node number ND. That is, it is possible to maximize an executable program capacity in each data driven type processor and the system.

As described above, when bit widths of the processor number field $F_{11}$ and the node number field $F_{12}$ are determined, an external switch is operated to set bit width data PL and NL, together with processor number data PE, in each data driven type processor according to the determined bit widths of the fields processor number field $F_{11}$ and the node number field $F_{12}$ Thereafter, the respective data driven type processors and the system are rendered operative.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processor connectable to at least one other data driven type information processor to form a data driven processing system, comprising:
    membership means for determining a membership number of data driven type information processor in the information processing system;
    adaption means, responsive to the membership means, operating upon a fixed length data packet having a least two subfields, for adaptively configuring the subfields as a function of the membership number;
    program storing means, responsive, to the adaption means, for storing a data flow program including a plurality of destination information and a plurality of instruction information, accepting a data packet including a destination field having at least two subfields, an instruction field, a first data field and a second data field, reading said destination information and said instruction information in a subsequent order of said data flow program by addressing based on the contents of the destination field in the data packet, storing the respective information in the destination field and the instruction field in said data packet and outputting the data packet;

data pair generating means for queuing said data packet output from said program storing means, storing data in said first data field in one of two data packets having the same destination information in said second data field in the other of said two data packets and outputting the other data packet; and operation processing means for accepting said data packet output from said data pair generating means, decoding said instruction information in the instruction field in the data packet, performing a predetermined operation processing with respect to two data in said first and said second data fields, storing the result in the first data field in the data packet and outputting the data packet, so that when a plurality of said information processors are coupled to form one system, said data packet comprises said destination information including a destination processor number for uniquely specifying one of said plurality of said information processors by which the data packet is to be processed and a destination node number for specifying said address, said data packet has the destination field for storing the destination information, and the subfields of the destination field are adaptively configured as a function of the membership number.

2. The data driven type information processor according to claim 1, wherein said destination field has a predetermined bit width, said predetermined bit width including a first bit width which is varied by the adaption means according to the membership number of said information processors in said system and which corresponds to said destination processor number, and a second bit width which the adaption means obtains by subtracting said first bit width from said predetermined bit width and which corresponds to said destination node number.

3. The data driven type information processor according to claim 1, further comprising branching means provided in a preceding stage portion to said program storing means and/or a succeeding stage portion to said operation processing means, said branching means inputting said data packet applied and responsively sending said input data packet to either said program storing means or outside said information processor according to said destination processor number stored in the input data packet.

4. The data driven type information processor according to claim 2, wherein
said program storing means includes memory means for storing said data flow program and second bit width storing means for storing said second bit width as data, and said program storing means inputs said data packet, reads said destination node number from the contents in a destination field in the data packet input according to said second bit width data stored in said second bit width storing means, reads said destination information and said instruction information in a subsequent order of said data flow program by addressing said memory means according to read said destination node number, stores the respective information in said destination field and said instruction field in the input data packet and outputs the input data packet.

5. The data driven type information processor according to claim 2, further comprising branching means provided in a preceding stage portion to said program storing means and/or a succeeding stage portion to said operation processing means, said branching means inputting said data packet applied and sending the input data packet to either said program storing means or outside said information processor according to said destination processor number stored in the input data packet.

6. The data driven type information processor according to claim 3, wherein said branching means further includes:
processor number storing means for storing a specific processor number for uniquely specifying said one information processor from among said plurality of information processors in said system,
comparing means for inputting said data packet applied and responsively comparing and collating said destination processor number stored in the input data packet with said specific processor number stored in said processor number storing means, and
outputting means for sending the input data packet to said program storing means in response to a collation match output of said comparing means and sending the input data packet outside said information processor in response to a collation mismatch output.

7. The data driven type information processor according to claim 4, further comprising branching means provided in a preceding stage portion to said program storing means and/or a succeeding stage portion to said operation processing means, said branching means inputting said data packet applied and sending the input data packet to either said program storing means or outside said information processor according to said destination processor number stored in the input data packet.

8. The data driven type information processor according to claim 5, wherein said branching means further includes:
processor number storing means for storing a specific processor number for uniquely specifying said one information processor from among said plurality of information processors in said system,
comparing means for inputting said data packet applied and responsively comparing and collating said destination processor number stored in the input data packet and said specific processor number stored in said processor number storing means, and
outputting means for sending the input data packet to said program storing means in response to a collation match output of said comparing means and sending the input data packet outside said information processor in response to a collation mismatch output.

9. The data driven type information processor according to claim 5, wherein
said branching means further includes first bit width storing means for storing said first bit width as data, and said branching means inputs said data packet applied and responsively sends the input data packet either to said program storing means or outside said information processor according to said destination processor number read from the input data packet based on said first bit width data stored in said first bit width storing means.

10. The data driven type information processor according to claim 7, wherein said branching means further includes:
  processor number storing means for storing a specific processor number for uniquely specifying said one information processor from among said plurality of information processors in said system,
  comparing means for inputting said data packet applied and responsively comparing and collating said destination processor number stored in the input data packet and said specific processor number stored in said processor number storing means, and
  outputting means for sending the input data packet to said program storing means in response to a collation match output of said comparing means and sending the input data packet outside said information processor in response to a collation mismatch output.

11. The data driven type information processor according to claim 7, wherein
  said branching means further includes first bit width storing means for storing said first bit width as data, and said branching means inputs said data packet applied and responsively sends the input packet either to said program storing means or outside said information processor according to said destination processor number read from the input data packet based on said first bit width data stored in said first bit width storing means.

12. The data driven type information processor according to claim 8, wherein
  said branching means further includes first bit width storing means for storing said first bit width as data, and
  said comparing means further includes means for inputting said data packet applied and comparing and collating said destination processor number read from the input data packet based on said first bit width data stored in said first bit width storing means with said specific processor number stored in said processor number storing means.

13. The data driven type information processor according to claim 10, wherein
  said branching means further includes first bit width storing means for storing said first bit width as data, and
  said comparing means further includes means for inputting said data packet applied and comparing and collating said destination processor number read from the input data packet based on said first bit width data stored in said first bit width storing means with said specific processor number stored in said processor number storing means.

14. An information processing system including a plurality of data driven type information processors, each of said data driven type information processors comprising:
  membership means for determining a membership number of data driven type information processors in the information processing system;
  adaption means, responsive to the membership means, operating upon a fixed length data packet having at least two subfields, for adaptively configuring the subfields as a function of the membership number;
  program storing means, responsive to the adaption means, for storing a data flow program including a plurality of destination information and a plurality of instruction information, accepting a data packet including a destination field having at least two subfields, an instruction field, a first data field and a second data field, reading destination information and instruction information in a subsequent order of said data flow program by addressing based on the contents of the destination field in the data packet, storing the respective information in the destination field and the instruction field in said data packet and outputting said data packet,
  data pair generating means for queuing said data packet output from said program storing means, storing data in said first data field in one of two data packets having the same destination information in said second data field in the other of said two data packets and outputting the other data packet, and
  operation processing means for inputting said data packet output from said data pair generating means, decoding instruction information in the instruction field in the data packet, performing a predetermined operation processing with respect to the two data in said first and said second data fields, storing the result in the first data field in the data packet and outputting the data packet,
  wherein said destination information at least includes a destination processor number for uniquely specifying said information processor by which the data packet is to be processed and a destination node number for specifying said address, and the destination field can be effectively used according to the number of said information processors of said system by adaptively configuring the subfields of the destination field as a function of the membership number.

15. The information processing system according to claim 14, wherein said destination field has a predetermined bit width, said predetermined bit width including a first bit width which is varied by the adaption means according to the membership number and which corresponds to said destination processor number, and a second bit width which the adaption means obtains by subtracting said first bit width from said predetermined bit width and which corresponds to said destination node number.

16. A method for processing data in a data driven type information processor connectable to at least one other data driven type information processor to form a data driven processing system, comprising:
  (a) storing a data flow program including a plurality of destination information and a plurality of instruction information;
  (b) accepting a data packet including a destination field having at least two subfields, an instruction field, a first data field and a second data field;
  (c) reading said destination information and said instruction information in a subsequent order of said data flow program by addressing based on the contents of said destination field in said data packet:
  (d) storing the respective information in said destination field and said instruction field in said data packet and outputting said data packet;
  (e) queuing said data packet output at said step (d);
  (f) storing data in said first data field in one of two data packets having the same destination information in said second data field in the other of said two data packets and outputting the other data packet;

(g) accepting said data packet output at said step (f);

(h) decoding said instruction information in said instruction field in said data packet;

(i) performing a predetermined operation processing with respect to two data in said first and second data fields;

(j) storing the result in said first data field in said data packet and outputting said data packet;

(k) uniquely specifying one of a plurality of said information processors by which said data packet is to be processed by a destination processor number and specifying said address by a destination node number relative to said plurality of said information processors coupled to form the data driven processing system wherein said data packet comprises said destination information including said destination processor number and said destination node number;

(l) determining a membership number of data driven type information processors in the data driven processing system; and (m) effectively using said destination field according to the number of said information processors of said system by adaptively configuring the subfields as a function of the membership number.

17. The method for processing data according to claim 16, wherein said destination field has a predetermined bit width, said predetermined bit width including a first bit width which is varied, in the step (m) of adaptively configuring according to the membership number of said information processors in said system, the first bit width corresponding to said destination processor number, and a second bit width which is obtained, in the step (m) of adaptively configuring, by subtracting said first bit width from said predetermined bit width, the second bit width corresponding to said destination node number.

18. The method for processing data according to claim 17, further comprising the steps of:

(m) storing said data flow program in a memory;

(n) storing said second bit width as data in a second bit width storage;

(o) inputting said data packets;

(p) reading said destination node number from the contents in a destination field in said data packet input according to said second bit width data stored in said second bit width storage;

(q) reading said destination information and said instruction information in a subsequent order of said data flow program by addressing said memory according to read said destination ode number; and (r) storing the respective information in said destination field and said instruction field in said input data packet and outputting the input data packet.

19. The method for processing data according to claim 17, further comprising the steps of inputting said data packet applied and responsively sending said input data packet at said step (a) or outside said information processor according to said destination processor number stored in the input data packet.

20. The method for processing data according to claim 19, further comprising the steps of:

(m) storing a specific processor number for uniquely specifying said one information processor from among said plurality of information processors in said system;

(n) inputting said data packet applied and responsively comparing and collating said destination processor number stored in the input data packet and said specific processor number stored at said step (m); and (o) sending the input data packet at said step (a) in response to a collation match output at said step (n) and sending the input data packet outside said information processor in response to a collation mismatch output.

21. A data driven processing system comprising:

a plurality of data driven processors;

each data driven processor operating upon data-flow-type data packets such that data is processed by the data driven processor according to data flow protocol;

each data-flow-type data packet including a fixed length destination field for storing destination information, the destination field having at least a first subfield corresponding to a desired data driven processor identification number and a second subfield corresponding to a desired data flow program node, each data driven processor including:

membership means for determining a membership number of data driven processors in the data driven processing system;

adaption means, responsive to the membership means, for adaptively configuring the subfields within the destination field of a data-flow-type data packet, in length as a function of the membership number.

22. A data driven processor system as in claim 21, wherein:

the first subfield length is variable according to the membership number; and the second subfield length equals a difference between the fixed length of the destination field and the first subfield length.

23. In a data driven processing system including a plurality of data driven processors, each data driven processor operating upon data-flow-type data packets such that data is processed by the data driven processor according to data flow protocol, each data packet including a fixed length destination field for storing destination information, the destination field having at least a first subfield corresponding to a desired data driven processor identification number and a second subfield corresponding to a desired data flow program node, a method of configuring data-flow-type data packets comprising:

(a) determining a membership number of data driven processors in the data driven processing system; and (b) adaptively configuring the subfields, within the destination field of a data-flow-type data packet, in length as a function of the membership number of data driven processors in the system.

24. A method as in claim 23, wherein the step (b) of adaptively configuring further comprises:

($b_1$) varying the first subfield length according to the membership number; and ($b_2$) determining the second subfield length by subtracting the first subfield length from the fixed length of the destination field.

* * * * *